US012631154B2

(12) United States Patent
Speyart Van Woerden

(10) Patent No.: US 12,631,154 B2
(45) Date of Patent: May 19, 2026

(54) HOT AIR ENGINE

(71) Applicant: Ceramic Stirling IP Holding LLP, London (GB)

(72) Inventor: Jan Pieter Christiaan Speyart Van Woerden, Cascais (PT)

(73) Assignee: CERAMIC STIRLING IP HOLDING LLP, London (GB)

( * ) Notice: Subject to any disclaimer, the term of this patent is extended or adjusted under 35 U.S.C. 154(b) by 0 days.

(21) Appl. No.: 19/136,060

(22) PCT Filed: Dec. 19, 2023

(86) PCT No.: PCT/NL2023/050670
§ 371 (c)(1),
(2) Date: Jun. 5, 2025

(87) PCT Pub. No.: WO2024/136649
PCT Pub. Date: Jun. 27, 2024

(65) Prior Publication Data

US 2026/0036099 A1 Feb. 5, 2026

(30) Foreign Application Priority Data

Dec. 20, 2022 (NL) ...................................... 2033760

(51) Int. Cl.
*F02G 1/055* (2006.01)

(52) U.S. Cl.
CPC .......... *F02G 1/055* (2013.01); *F02G 2254/10* (2013.01)

(58) Field of Classification Search
CPC ............................. F02G 1/055; F02G 2254/10
See application file for complete search history.

(56) References Cited

U.S. PATENT DOCUMENTS 3,397,533 A * 8/1968 Steiner .................... F02D 41/30
60/524
4,354,352 A 10/1982 Hoke
(Continued)

FOREIGN PATENT DOCUMENTS

JP S61247849 A 11/1986

OTHER PUBLICATIONS

International Search Report and Written Opinion for International Application No. PCT/NL2023/050670, filing date Dec. 19, 2023, 7 pages.

*Primary Examiner* — Hoang M Nguyen
(74) *Attorney, Agent, or Firm* — KDW Firm PLLC

(57) ABSTRACT

A hot air engine for converting heat into motion, comprising a wall member, comprising a cylindrical wall surrounding a central axis and an end wall extending through the central axis; a displacer member comprising a cylindrical displacer part co-axial with the cylindrical wall and a displacer end part extending through the central axis, the displacer member is movable, relative to the wall member, back and forth along the central axis to move a working fluid between a first chamber and a second chamber of the engine through the regenerator passage defined by the cylindrical wall member and the cylindrical displacer member; and a heating system provided with a heating zone separated from the first chamber by the end wall, wherein the cylindrical displacer part and the displacer end part together surround the cylindrical wall and the end wall, wherein the end wall defines the heating zone within the wall member.

11 Claims, 5 Drawing Sheets

(56) References Cited

U.S. PATENT DOCUMENTS

| | | | | |
|---|---|---|---|---|
| 5,715,683 | A * | 2/1998 | Hofbauer | F02G 1/057<br>60/520 |
| 6,381,958 | B1 * | 5/2002 | Kamen | F02G 1/057<br>60/524 |
| 2003/0066282 | A1 * | 4/2003 | Kamen | F02G 1/055<br>60/520 |
| 2003/0163990 | A1 * | 9/2003 | Maceda | F28D 9/0018<br>60/520 |

* cited by examiner

HOT AIR ENGINE

CROSS-REFERENCE TO RELATED APPLICATIONS

This is a national stage application filed under 35 U.S.C. § 371 of pending international application PCT/NL2023/050670, filed Dec. 19, 2023, which claims priority to Netherlands patent application 2033760, filed Dec. 20, 2022, the entirety of each application is hereby incorporated by reference herein.

The present invention relates to a hot air engine for converting heat into motion.

Engines may operate on a variety of thermodynamic cycles (e.g., Ericsson, Brayton or Stirling), but are colloquially referred to as hot air engines or Stirling engines. In a hot air or Stirling engine, a fixed volume of working fluid, usually a gas, is shuttled between a hot space and a cold space. Commonly used gases are hydrogen, helium, nitrogen and air. At the cold space, the gas is compressed, at the cost of a certain amount of mechanical work. The gas is then shuttled to a hot space, causing it to heat up and increase in pressure. The gas then expands. Because the expansion takes place at a higher pressure, the mechanical work that can be extracted is greater than the work required to compress the gas when cold.

A component of the Stirling engine that contributes to its efficiency is the regenerator, which is an arrangement through which the working gas travels from the hot to the cold space and back. The regenerator may comprise many narrow tubes or a passage filled with random fibres offering a surface. On the way from hot to cold, the gas will give off heat to the material of the regenerator. On the way back, the gas retrieves that heat again. This reduces the amount of fuel needed to raise the temperature of the gas in the hot space.

An advantage of Stirling engines is their silent operation. Stirling engines are for instance used in the Gotland-class "stealth" submarines of the Swedish Navy, and for power generation on luxury yachts or off-grid situations. Another advantage is that the combustion is separate from the working fluid. This allows for optimisation of the combustion process, which can eliminate $NO_x$ and particle emissions. It also allows for a wide choice of fuels, including carbon free fuels such as hydrogen and ammonia, or carbon neutral fuels such as Vulcanol. A further advantage is that Stirling engines are ideally suited for domestic combined heat and power (CHP). Large centralised thermal power plants reject much of the heat generated in their furnaces into the environment as low grade waste heat. Stirling engines, because of their silent operation, can be deployed at the household level to efficiently generate electricity and capture the waste heat for domestic hot water and home heating. In this role, they have the potential to complement solar power by supplying the household with heat and electricity in the winter months with greater efficiency than a centralised power plant.

Some drawbacks have precluded the widespread introduction of Stirling engines, mainly cost and low efficiency in practice. Both disadvantages are related to material problems encountered at the hot side of the engine. For efficiency, it is preferred if the hot side of a Stirling engine is exceedingly hot, the working fluid is kept at a high pressure, and/or the wall section configured to conduct heat from the combustion zone to the working fluid is large. The alloys used to contain the hot pressurised fluid are subject to the corroding influence of hot combustion gases, resulting in durability issues which have required the use of expensive alloys at the hot side of these engines. These alloys are expensive as raw materials and expensive to weld, cast or machine. Nonetheless, even where these expensive materials are used, the maximum temperature in Stirling engines can rarely exceed 600 degrees Celsius, as there are few such materials readily available that are creep resistant above that temperature.

It is therefore an object of the present invention, amongst other objects, to at least partially alleviate the aforenoted drawbacks.

Hereto, a hot air engine for converting heat into motion, wherein the engine comprises:

- a wall member, defining a central axis and comprising a cylindrical wall surrounding the central axis and an end wall extending through the central axis;
- a displacer member comprising a cylindrical displacer part co-axial with the cylindrical wall and a displacer end part extending through the central axis, wherein the end wall and the displacer end part define a first chamber for containing a working fluid and wherein the cylindrical wall member and the cylindrical displacer member define a regenerator passage extending from the first chamber to a second chamber of the engine, wherein the displacer member is movable, relative to the wall member, back and forth along the central axis to move the working fluid back and forth between the first chamber and the second chamber through the regenerator passage;
- a heating system provided with a heating zone separated from the first chamber by the end wall, wherein the end wall is configured for conducting heat from the heating zone to the first chamber.

The cylindrical displacer part and the displacer end part together surround the cylindrical wall and the end wall, wherein the end wall defines the heating zone within the wall member.

This arrangement has the advantage that the hottest part of the engine, the heating zone, is at the centre of the engine instead of surrounding it, which reduces heat loss to the environment.

Specifically, the end wall may extend from the cylindrical wall, in particular an end thereof, through the central axis. The displacer end part may face the end wall and extend through the central axis from the cylindrical displacer part, in particular an end thereof that corresponds to said end of the cylindrical wall such that the end wall and the displacer end part are at the same side of the engine. The regenerator passage may extend from the first chamber along the central axis in a direction away from the displacer end part. The second chamber may thus be at a second end of the engine, opposite to the engine end with the end wall and the displacer end part, and may for instance be defined by the cylindrical wall and the cylindrical displacer part, in particular ends thereof opposite to the ends with the end wall and the displacer end part.

The hot air engine may comprise a motion conversion system arranged to convert movement of the displacer member into mechanical work. Preferably, the motion conversion system comprises a piston system comprising a cylinder and a power piston arranged movable back and forth within the cylinder to alternatingly compress and expand the working fluid in the second chamber. As such, in the engine, working gas can be shuttled between the first chamber and the second chamber. In the second chamber, the gas can be compressed by the piston system. The gas is then shuttled to the first chamber where it heats up, increases in pressure and expands, thereby moving the displacer member. Because the expansion takes place at a higher pressure, the mechanical work that can be extracted from the movement of the displacer member exceeds the work done by the piston to compress the gas in the second chamber. It is then further preferred if the motion conversion system is arranged to couple respective reciprocating movements of the power piston and the displacer member such that the reciprocating movements of the power piston and the displacer member are out of phase, preferably between 10 and 170 degrees, more preferably between 75 and 105 degrees, for instance about 90 degrees.

According to a preferred embodiment of the hot air engine, the heating system is provided with one or more supply passages for an inflow of fuel and air into the heating zone, wherein the heating system is arranged to combust the fuel in the heating zone, wherein the heating system is further provided with an exhaust passage for an outflow of combustion products from the heating zone. The heating system can generate heat in the heating zone through a chemical reaction. It is to be appreciated that the term "combustion" may refer to any exothermic reaction, including reactions that do not include oxygen as an oxidant. The reactants participating in the reaction are transported into the heating zone via one or more inflow passages. The reaction products are transported out of the heating zone via one or more outflow passages. The inflow and outflow passages are preferably arranged so as to constitute heat recovery means between the in-flowing and out-flowing materials, as described further below. Alternatively, the combustion may take place outside of the heating zone, in a combustion zone outside of the engine, wherein the heat is transferred into the heating zone by a heat supply passage. Furthermore, according to a further alternative embodiment, the heating system may comprise a heat pipe arranged to transfer heat from a heat source outside the engine into the heating zone, in particular the end wall. As such, various alternatives for configuring the heating system to heat the heating zone can be envisaged, which are provided with a means or passage to supply energy into the heating zone.

The first and the second chamber may be referred to as hot space and cold space, respectively. The high-pressure hot space communicates with the high-pressure cold space via the high-pressure regenerator passages for the transfer of high-pressure working fluid therebetween. The high-pressure regenerator passage and the in- and outflow passages constituting the heat recovery means are preferably of substantially equal length and are preferably arranged next to each other so that the temperature gradients along their length substantially coincide.

As such, according to a further preferred embodiment of the hot air engine, the exhaust passage extends from the heating zone along the regenerator passage and is separated from the regenerator passage by the cylindrical wall, wherein the wall member, in particular the cylindrical wall, is configured for conducting heat from the exhaust passage to the regenerator passage. That is, the exhaust passage preferably extends next to the regenerator passage. By arranging the regenerator passage of the working fluid and the passage for exhaust in such a way, mutual heat transfer can be maximised and/or heat loss to the environment can be minimised.

The hot air engine preferably further comprises a housing surrounding the displacer member, wherein the housing and the displacer member define a pressure space therebetween, wherein the pressure space is arranged to be pressurised, wherein the displacer member is movable within the housing back and forth along the central axis or the displacer member and the housing are attached to each other and are jointly movable back and forth along the central axis.

This arrangement can provide a completely enclosed pressure vessel that enables a silent operation, minimises the risk of leaking working fluid, and enhances reliability and longevity of the engine. Furthermore, the arrangement allows many of the mechanical and electrical parts to be outside of the pressure vessel, thus enabling easy maintenance.

Preferably, the displacer member comprises insulating material or is surrounded by, or made of, insulating material. This allows the housing to be at a lower temperature. The housing can then be made of a material with a suitable ratio of tensile strength to price, such as steel or fibreglass, and can suitably serve as the enclosure of the engine.

According to a further preferred embodiment of the hot air engine, the heating system comprises a cylindrical heat exchanging wall co-axial with the cylindrical wall of the wall member, wherein the cylindrical wall and the heat exchanging wall define the exhaust passage therebetween, wherein the supply passage, in particular for an inflow of air, extends to the heating zone along the exhaust passage and is separated from the exhaust passage by the heat exchanging wall. That is, the supply passage preferably extends next to the exhaust passage. This way, air can be preheated by the exhaust gases as they leave the heating zone, as in a counter flow heat exchanger. This arrangement can advantageously put the pre-heater inside the engine, so it is no longer a separate source of heat loss to the environment and does not require additional insulation taking up extra space. As such, the passages for air and exhaust are arranged in such a way that internal heat transfer is maximised and heat loss to the environment is minimised.

According to a further preferred embodiment, the wall member and the heating system are provided with mutually cooperating installation means for removably mounting the heating system to the wall member.

This way, the burner section can be made modular and easily swappable. This allows for the convenient installation of domestic CHP, which can be first based on methane or other less renewable fuel. Later, the engine can be easily adapted to a more renewable fuel as soon as it becomes available. Vulcanol, a type of methanol produced from volcanic $CO_2$ and geothermal energy, can be burned as easily as $NH_3$ and has been proposed as a suitable liquid energy storage medium. Thus, due to the installation means, flexibility is built into the system. Particularly in case the displacer member surrounds the cylindrical wall member, and the housing surrounds the displacer member to form a pressure space, the burner can be advantageously swapped for burners for a different fuel without breaching the pressure vessel.

According to another aspect, a hot air engine for converting heat into motion is provided, preferably according to any of the above embodiments, wherein the engine comprises:

- a wall member, defining a central axis and comprising a cylindrical wall surrounding the central axis and an end wall extending through the central axis;
- a displacer member comprising a cylindrical displacer part co-axial with the cylindrical wall and a displacer end part extending through the central axis, wherein the end wall and the displacer end part define a first chamber for containing a working fluid and wherein the cylindrical wall member and the cylindrical displacer member define a regenerator passage extending from the first chamber to a second chamber of the engine, wherein the displacer member is movable, relative to the wall member, back and forth along the central axis to move the working fluid back and forth between the first chamber and the second chamber through the regenerator passage;

a heating system provided with a heating zone separated from the first chamber by the end wall, wherein the end wall is configured for conducting heat from the heating zone to the first chamber, wherein the end wall is concave towards the heating zone and convex towards the first chamber.

In operation, the heating zone can be at a relatively high temperature and at a relatively low pressure, while the working fluid in the first chamber is at a relatively high pressure and relatively high temperature. As the end wall is concave towards the low-pressure heating zone and convex towards the high-pressure first chamber, the material in the end wall is substantially in compression as a result of the pressure differential. That is, if the pressure of the working fluid in the first chamber is higher than the pressure in the heating zone, the end wall is in compression. This has the following advantage. There are refractory materials that are easy to cast and machine, low in cost, creep resistant at elevated temperatures, chemically stable, and thermal shock resistant. These are generally strong in compression but not in tension. Mullite is an example of such a refractory material. By subjecting the end wall, which is subject to high heat and pressure, to mainly compression forces, the end wall can be made of a ceramic or similar refractory material that is resistant to heat, chemically stable, and strong in compression, and substantially higher operating temperatures of the hot end of the engine can be provided. As such, according to a preferred embodiment of the hot air engine, the end wall is made of a refractory material such as mullite.

Furthermore, instead of a combustion system, the heating system may comprise a solar collector, arranged to convert solar energy into heat in the heating zone by directing the solar radiation into the heating zone through an aperture that may comprise an optical element where the directed radiation is converged, or a source of molten silicon at a temperature of, e.g., 1700 to 1800 kelvin, wherein the heating system is arranged to direct radiation from the molten silicon source into the heating zone. In either case, the convex shape of the end wall is particularly advantageous as it provides an increased radiation-absorbing surface to which the radiation can be directed. It is then preferred if the inner surface of the cylindrical wall of the wall member has reflective properties, such that most of the radiation can ultimately be absorbed by the end wall.

The invention is hereafter further elucidated with reference to the attached drawings, wherein.

Throughout the drawings, like elements are indicated by like reference signs.

Figure 1:
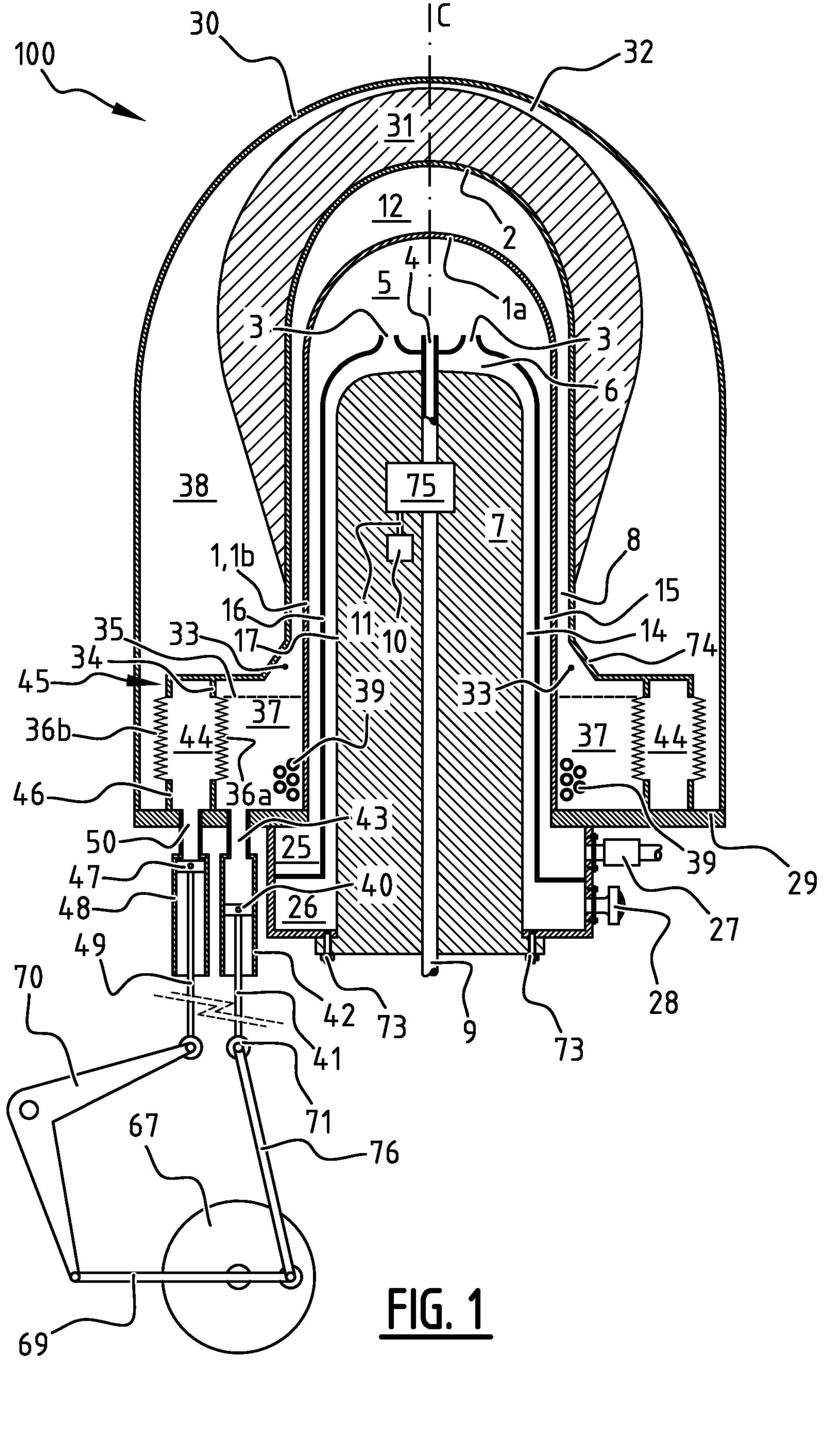
FIGS. 1 and 2 show the hot air engine in the compression and expansion phases.
Figure 2:
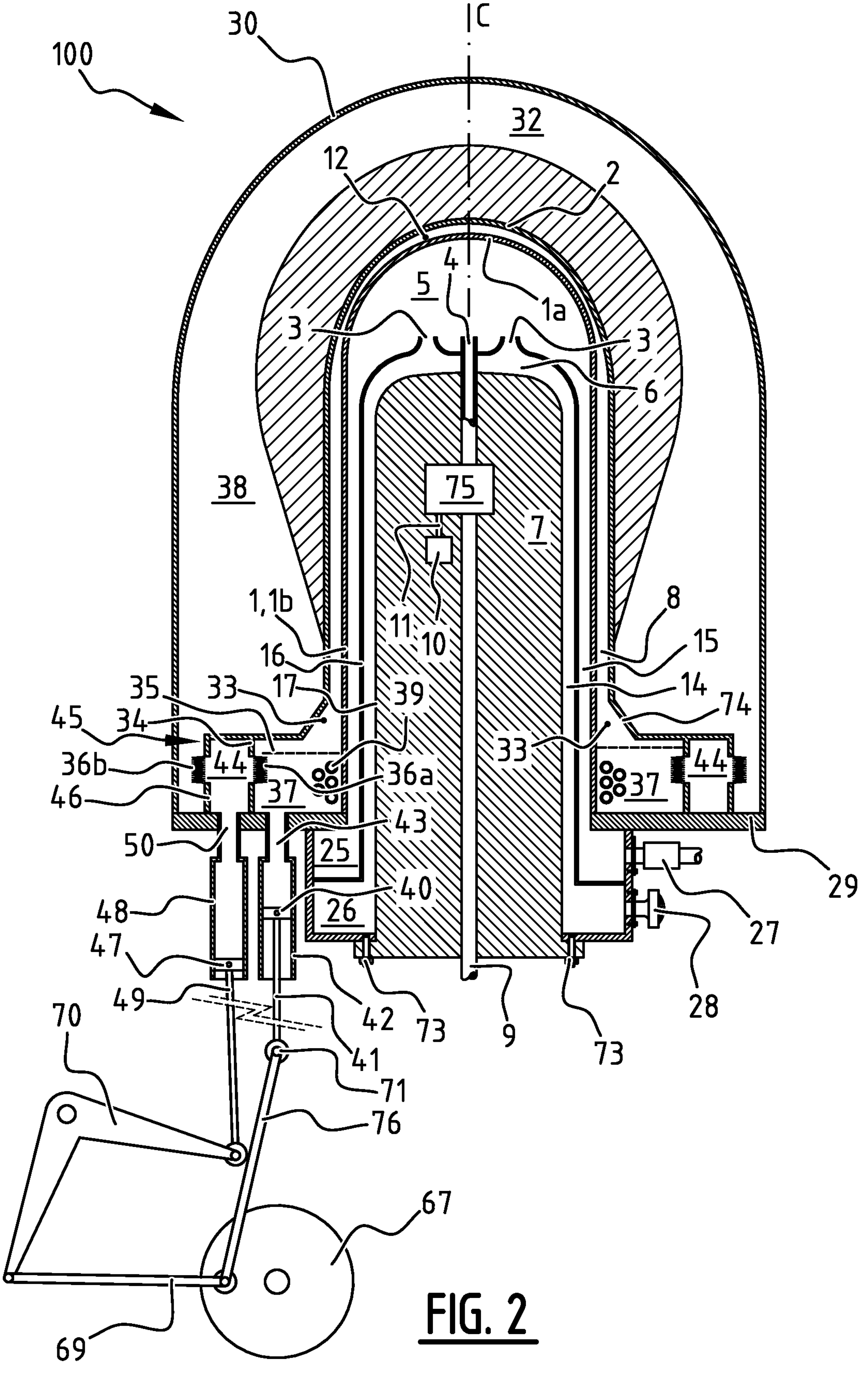

FIGS. 1 and 2 represent a hot air engine 100 according to the invention in the compression and expansion phases, as seen in a vertical cross-sectional view through a central axis of the engine 100. The engine 100 comprises a wall member 1, comprising an end wall 1*a* extending through the central axis C and a cylindrical sidewall 1*b*. Together with a displacer member 2, the wall member 1 defines a first chamber 12 and a regenerator passage 8 extending from the first chamber 12 to a second chamber 33. The engine 100 is mounted vertically, hot end (first chamber 12) up. The displacer member 2 is movable, relative to the wall member 1, back and forth along the central axis C to move a working fluid back and forth between the first chamber 12 and the second chamber 33 through the regenerator passage 8. A combustion system, arranged to heat a combustion zone 5 separated from the first chamber 12 by the end wall 1*a*, is provided with a fuel supply passage 9 and air supply passages 14 into the combustion zone 5. The end wall 1*a* conducts heat from the combustion zone 5 to the first chamber 12. The combustion system is further provided with an exhaust passage 15 for an outflow of combustion products from the combustion zone 5.

The heating zone 5 is located inside the hot end of the cylindrical wall member 1. The wall member 1 has walls that are curved in one or more planes. The top 1*a* is dome-shaped, offering curvature in two planes. Although not shown, the end wall 1*a* may be provided with a heat transfer enhancing structure comprising, e.g., ribs, fins or other protrusions for enhancing the heat transfer from the hot combustion zone 5 to the first chamber 12. The sides 1*b* of the wall member 1 are cylindrical, offering curvature in one plane. If the pressure of working gas in hot space 12 is higher than the pressure in combustion zone 5, the walls of the wall member 1 are in compression. The curvatures in the walls 1 offer load paths to compression forces similar to the arches of a bridge, or the roof of a dome.

For the engine 100 to be powerful and efficient, the pressure of the working gas in hot space 12 is preferably high. The heating zone 5 is typically at ambient or near-ambient pressure. As such, the wall member 1 can be constantly kept in compression, even if the pressure in the hot space 12 fluctuates throughout the Stirling thermodynamic cycle. The wall member 1 can therefore be made of a ceramic or similar refractory material that is resistant to heat, chemically stable, and strong in compression.

This arrangement has the additional advantage that the hottest part of the engine 100, the combustion zone 5, is at the centre of the engine 100. This can minimise heat loss to the environment.

The combustion zone 5 is supplied with air. For efficiency, this air is preferably preheated by the exhaust gases as they leave the combustion zone 5, as in a counter flow heat exchanger. Inflow passage 14 is defined between cylindrical walls 16 and 17. Exhaust passage 15 is defined between cylindrical heat-exchanging wall 16 and the sidewall 1*b* of wall member 1. Flow passages 14 and 15 thus extend along the inside of the perimeter of the wall member 1 and are, together with the regenerator passage 8, annular as seen in a plane perpendicular to the central axis C. Cylindrical walls 16 and 17 are made of the same material as wall 1. This arrangement advantageously places the pre-heater internal to the engine 100, so it is no longer a separate source of heat loss to the environment, and does not require additional insulation taking up extra space. The air for combustion, after rising through annular passage 14 while picking up heat, is collected in plenum 6 and enters the combustion zone 5 through jets 3. Jet 4 provides the fuel to the combustion zone 5.

Given the temperature of the combustion zone 5, certain fuels may be at risk of dissociating before reaching the burn area 5. For example, methane may dissociate into hydrogen and carbon (soot), which can result in coking up of fuel supply passage 9. This can be prevented by insulating fuel supply passage 9 with insulating material 7, to keep it cool for as long as possible, and by adding an agent that can react with the free carbon at the temperatures of the combustion zone 5 and keep elemental carbon from fouling the heating system, such as water and carbon dioxide. Examples of chemical reactions that may achieve this include:

$$H_2O + C \rightarrow H_2 + CO$$

$$CO_2 + C \rightarrow 2CO$$

Water can be conveniently added as an agent, as it can readily vaporise in a vaporiser 10 and be premixed with natural gas in a pre-mixer 75 to which the water is guided by conduit 11. Many such vaporiser and premixing means are known in the art. If the fuel is hydrogen, it cannot dissociate. Ammonia can dissociate into hydrogen and nitrogen without causing fouling. Methanol can dissociate in hydrogen and carbon monoxide without causing any fouling either. No premixing would be needed with any of these three fuels.

In the case of combustion at such elevated temperatures, formation of thermal $NO_x$ may become an issue, which is a pollutant formed in a flame front of hot combustion with preheated air. In this case, the combustion arrangement preferably comprises a central fuel jet 4, surrounded by a plurality of air jets 3. The arrangement is illustrated as one of many possible means to reduce the formation of thermal $NO_x$. A flame front can be avoided with flameless oxidation (FLOX). This technology can eliminate $NO_x$ formation by injecting air and fuel in distinct orifices into the combustion zone 5 to generate turbulent recirculation regions. Other means to mitigate $NO_x$ formation may also be employed.

The return path of the exhaust gases extends through annular passage 15, which puts the hot exhaust passage 15 next to the regenerator passage 8 between the displacer 2 and the cylindrical wall 1*b*. This has the following advantage. In practice, relatively little heat is transferred to the working gas via the hot cylinder heads, as a result of the low thermal conductivity of the gas. In some engines, the combustion heat is transferred into the working gas in a zone arranged as a heat exchanger between the combustion gases and the working gas, referred to as the "heater". The working gas travels through this heater on its way from the regenerator, where it is pre-heated, to the hot expansion zone. These heaters are arranged as crossflow heat-exchangers, where the flow of combustion gas is traverse to the flow of working gas. However, crossflow heat exchange is less efficient than counter-flow heat exchange. Referring to FIGS. 1 and 2, by leading the exhaust gases through the exhaust passage 15 along the cylindrical wall 1*b* of the wall member 1, the exhaust gas is in counter-flow to the working gas as the latter gets heated on its way to the hot space 12 via the regenerator passage 8.

Figure 3:
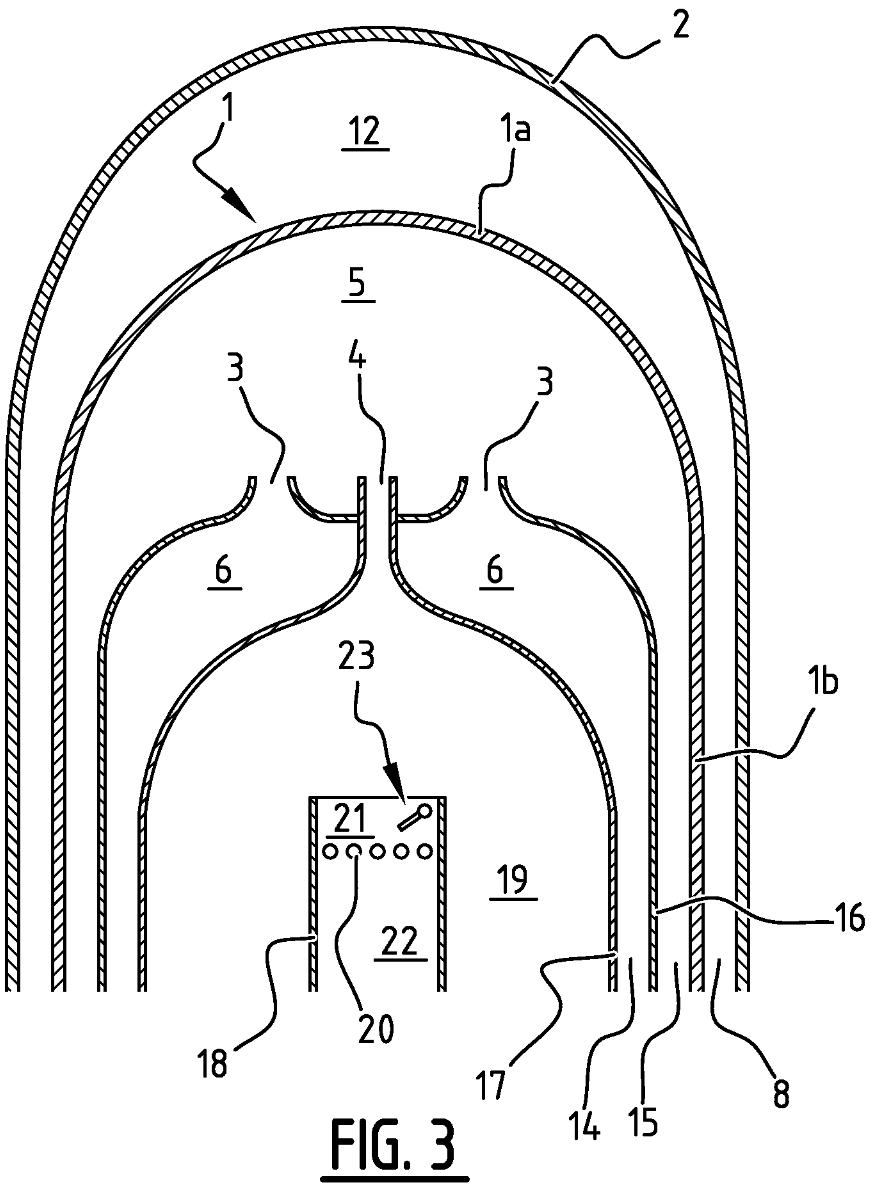
FIG. 3 shows an alternative fuel arrangement.

FIG. 3 shows an alternative combustion system, specifically an arrangement for using solid fuel such as wood chips or wood pellets. The solid fuels are preferably gasified before combustion, preferably inside the engine. Gasification with a first amount of air, prior to combustion with a second amount of air, has the following advantages. For instance, a hotter, and therefore more complete, combustion can be obtained. Further, gasification at a lower temperature than the combustion results in a reduction of the volatilisation of alkaline elements in the fuel, resulting in the reduction of polluting and corroding aerosols.

A disadvantage of gasification in a conventional arrangement, i.e., outside of the engine, is that part of the heating value of the fuel may be lost in the gasification process, and gasification may cause problems related to tar formation in the conduits of the gas. These problems can be obviated by arranging the gasification to take place in a gasification zone 21 adjacent, preferably directly adjacent, to the combustion zone 5 within the wall member 1. The solid fuel may be brought up to the gasification zone 21 by a vertical auger, for instance formed by a spiralling protrusion (not shown) in cylindrical wall 17 and/or cylindrical wall 18, wherein wall 18 is arranged to rotate, for instance about the central axis C, for augering the fuel vertically upwards. Alternative means for vertical transport of the fuel are also possible.

On the way up via annular space 19, the fuel is heated as it traverses the thermal gradient between the cold end of the wall member 1 at the bottom, and the hot end at the top 1*a*. The fuel can be dried and pyrolysed. The volatile fraction of the fuel can vaporise and exit through orifice 4. The char will be pushed over the top edge of circular wall 18 and accumulate on grate 20, where it can be gasified by a small flow of air forced upwards through the central void 22. The gasification products move to the combustion zone 5 through jet 4. Ash may fall down through grate 20 and down void 22 into a receptacle at the bottom of the engine, i.e., the cold end. The heat of the gasification, resulting from a partial combustion, can advantageously move with the gas to the combustion zone 5. By preventing the gases from cooling down after the gasifier, tar condensation in conduit 4 can be minimised. The gasification rate may be controlled by controlling the supply of the first amount of air to the gasification zone 21. The supply of the second amount of air is preferably regulated so as to ensure a sufficient amount of oxygen for a complete combustion. Mechanical sensor 23 sensing the level of material in the gasification zone 21 may be arranged to actuate a switch for turning the auger on or off. The auger and, e.g., the supply of air can be controlled in ways known in the art. Instead of a continuous supply of fuel to the heating system, for fuel supply the heating system may comprise a fuel container for storing fuel such that the heating system can operate in batch mode, wherein the container is filled with fuel between engine runs. Hereto, the container may be provided with a closable inlet for filling the container.

Referring again to FIGS. 1 and 2, it can be illustrated how air and fuel are supplied into the engine 100 to the inside of the wall member 1 and combustion products are removed. The exhaust passage 15 and the air supply passage 14 are fitted with plenums 25 and 26 which are respectively connected to extractor means 27 and filter 28.

The wall member 1 stationary and the bottom of the cylindrical wall 1*b* is fixedly attached to a bottom plate 29. To increase and decrease the size of the hot space 12, the displacer 2 is made to move up and down, as described further below. Threads and/or bolted or screw joints 73 enable the fuel assembly, in this case comprising fuel line 9, insulating material 7 and an igniter (not shown), to be removed and replaced with another fuel assembly, for instance one for solid fuel as shown in FIG. 3, or to be removed for filling the fuel container with fuel as described above and placed back into the engine for another engine run.

As shown in FIGS. 1 and 2, the engine 100 comprises an outer cylindrical housing wall 30, surrounding the displacer 2. The bottom of the wall 30 is attached to the bottom plate 29. The space 38 between the housing wall 30 and the displacer 2 can be pressurised, e.g. by a pump or other pressurising means (not shown), such that the pressure is higher than, or at least equal to, the highest pressure that is reached in the pressure cycle of the working gas in the hot space 12. As a result, the displacer 2 is in compression. Although the displacer 2 is generally not exposed to the temperature in the burner, as the wall member 1 is, it is nonetheless preferred if the displacer 2 can withstand temperatures higher than metal alloys generally allow, in order to further enhance the efficiency. By keeping the wall of the displacer 2 in compression, it can be made of the same refractory material as the wall member 1. Using the same material has the additional advantage that the displacer 2 and the wall member 1 can expand thermally to the same extent, thus allowing for closer manufacturing tolerances. The wall of the displacer 2 may be insulated with suitable, lightweight refractory insulating material 31. This allows the outer housing wall 30 to be at ambient temperature, or to at least not reach the temperatures reached at the wall member 1. The outer housing wall 30 can therefore be made of a material with a suitable ratio of tensile strength to price, such as steel or fibreglass, and can serve as the enclosure of the engine 100. Preferably, a gap 32 between the housing wall 30 and the displacer 2 is maintained to allow for movement of the displacer 2 and its insulation 31 along the central axis C. As such, the wall member 1, the bottom plate 29 and the outer housing wall 30 form an enclosure 38 that can be pressurised. The pressure in gap 32 is preferably higher than, or at least equal to, the pressure in hot space 12 throughout the engine cycle, such that the wall of the displacer 2 remains in compression. Likewise, the pressure in hot space 12 is preferably higher than in the heating zone 5 throughout the engine cycle, such that the wall member 1 remains in compression.

The cold space 33 is annular as seen in the plane perpendicular to the central axis C and surrounds the cylindrical wall 1*b*. By arranging the cold space 33 around the wall member 1, the passages for the heating system can conveniently extend through the bottom of the engine 100. Cold space 33 is thus bound by the wall member 1 on one side and, on the other side, by a widened section 34 of the displacer 2, a sloping section 74 connecting the main wall of the displacer 2 and the widened section 34, and a surface 35 of a liquid piston 37 at the bottom. As described above, the cold space 33 is in fluid communication with the hot space 12 via the regenerator passage 8. As the displacer 2 is movable, the widened wall section 34 that moves with it is provided with a movable seal 36*a* in contact with a wall extending downwards to the bottom plate 29. This seal 36*a* may be made of any suitable material and is preferably a bellows or a rolling diaphragm seal to enhance longevity and minimise pressure losses. The shown seal 36*a* is a bellows.

The volume of cold space 33 is reduced or expanded as the level of the surface 35 of the liquid piston 37 goes up or down. Water has a high thermal capacity and would be a suitable liquid piston. Cold space 33 may be filled with stainless steel wool. The wool can absorb heat from the gas upon compression. Alternative arrangements comprising fins, pins or other shapes, or materials other than steel, can be employed, provided that a heat transferring surface for the working gas is sufficiently provided. The heat can, in turn, be retrieved from the steel wool, or other material, by the liquid piston 37 as the level of the surface 35 of the liquid piston 37 rises in the annular cold space 33. The piston liquid 37, in turn, can be cooled by suitable cooling means such as cooling fins on the bottom plate 29 or, as shown in FIGS. 1 and 2, conduits 39 that may be coiled and through which a cooling fluid can circulate. While the piston liquid 37 operates at high pressure, the cooling fluid in the coiled conduits 39 can be kept at ambient pressure, so that the cooling fluid can carry the heat from the compression of the cold space 33 out of the engine 100 into, e.g., a domestic water heater or a radiator. The liquid piston 37 can be actuated by a piston 40, arranged to slide back and forth inside a piston cylinder 42 upon actuation by a rod 41. The piston cylinder 42 is in fluid communication with the liquid piston 37 through a hydraulic conduit 43 extending through the side of the outer housing wall 30 or, as shown, through the bottom plate 29.

In the following, a preferred way to extract mechanical work from the engine is described. When the displacer 2 moves upwards, the displacer 2 works against the gas in gap 32. The gas in the gap 32 urges the displacer 2 to move downwards. Due to the high pressure in the space between the outer housing 30 and the displacer 2, the pressure differential between the gas in the gap 32 and the gas in the first chamber 12 or the second chamber 33 is such that the displacer 2 is pushed downwards.

The displacer 2 is connected with annular piston 45 that is connected to a wall 46 via movable bellows 36*b*, or another type of flexible seal, to allow axial movement of the displacer 2 relative to the wall 46. The wall 46 and the piston 45 define a volume 44 for containing a hydraulic fluid. A hydraulic conduit 50 is connected to the volume 44 containing hydraulic fluid, wherein the annular piston 45 is actuated by a second piston 47 horizontally slidable back and forth within a second piston cylinder 48, actuated by a rod 49. Piston cylinder 48 is thus in fluid communication with the hydraulic fluid in said volume 44 via the hydraulic conduit 50, which extends through the outer housing wall 30 or, as shown, through the bottom plate 29. Piston rods 41 and 49 connect the pistons 40 and 47 to a drive train. Such a drive train typically comprises a crank shaft or cam drive connecting the piston rods 41 and 49 such that the movements of piston 40 and displacer 2 are out of phase. Many mechanisms are known to obtain such connection. In the example schematically shown in FIGS. 1 and 2 merely for illustration, a crank 67 (rotating clockwise) and a rod 76 may act on piston 40 through a crosshead 71 and piston rod 41, with rod 69 acting on piston 47 through a bell-crank 70 and rod 49. FIG. 2 shows the engine 100 in the compression phase, wherein the displacer 2 is at the lowest position of its stroke, and wherein the working gas is in the cold space 33 and therefore at a relatively low pressure. The piston 40 is on its way moving upwards, pressing the piston liquid 37 upwards and compressing the air in the cold space 33. Then, in a transfer phase (not shown), piston 40 is at the top of its stroke, the gas in the cold space 33 has been compressed and the displacer 2 is on its way moving upwards, wherein the gas is transferred from cold space 33 to hot space 12. The gas is (pre) heated by the regenerating action of the regenerator passage 8. FIG. 1 shows the engine 100 in the subsequent expansion phase, with the displacer 2 fully up and the working gas in hot space 12. In a subsequent phase (not shown), piston 40 is at the lowest position of its stroke and the working gas has expanded. The displacer 2 is moving the expanded gas from the hot space 12 to the cold space 33, wherein the gas is cooled as it passes through the regenerator passage 8 and by the walls 74 of the cold space 33. As the pressure is low again, the gas can again be compressed as the engine cycle is repeated. Although the displacer 2 could be connected to such a drive train with conventional means such as levers and/or pushrods, hydraulic means are particularly advantageous in this case because the movement in the displacer 2 can be relatively small in comparison with, e.g., a conventional Stirling engine, in order to ensure that the gas throughout the first chamber 12 can be in close proximity of the heat-conducting end wall 1*a*. A displacer stroke that is small is kinematically disadvantageous when directly connecting it to a drive train. In contrast, in the present example as shown in FIGS. 1 and 2, the second piston 47 can have a relatively small surface, allowing it to have a longer stroke, which is kinematically preferred. Alternatively, cold space 33 could be bound by a mechanical piston, actuated by traditional means to a drive train.

The hydraulic conduits 43 and 50 allow for the positioning of the piston cylinders 42 and 48 in any advantageous position outside the pressure vessel formed by the outer housing wall 30 and the bottom plate 29.

When the displacer 2 moves upwards during the expansion phase of the cycle, therewith increasing the volume of the hot space 12, the volume of the cold space 33 increases by the area of wall section 74 as projected on a plane perpendicular to the central axis C. However, the volume of the cold space 33 is preferably zero in this phase. Therefore, at the same time, piston 40 is preferably urged upwards to raise the level of the piston liquid surface 35 at the same speed as the rising speed of the walls 34 and 74 which define the cold space 33. This can be achieved by actuating the corresponding piston rod 41 with a cam drive with a suitable cam profile.

As such, the arrangement, of which an example is shown for illustration, can provide a completely enclosed pressure vessel, with ensures silence, prevents gas leaks and enhances reliability and longevity, wherein most mechanical and electrical parts can be installed outside of the pressure vessel for convenient maintenance, and wherein burners can be swapped for burners for a different fuel without breaching the pressure vessel to enable fuel flexibility. Furthermore, temperature differentials can be increased for efficiency and the engine can be produced in a convenient, low-cost manner.

Figure 4:
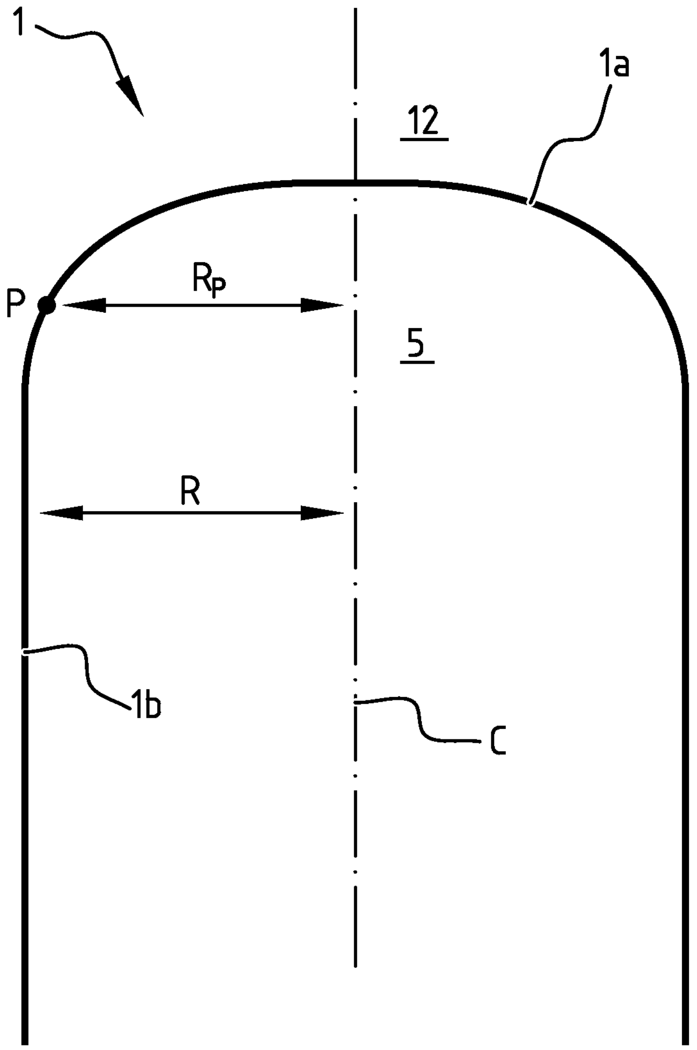
FIGS. 4 and 5 show alternative shapes for the wall member of the hot air engine.

FIG. 4 represents a wall member 1 for the hot air engine 100 that has a different shape as seen in a vertical cross-sectional view through the central axis C thereof. The end wall 1*a* is shaped to be concave towards the heating zone 5 and convex towards the first chamber 12, such that the wall member 1 can be efficiently made of a refractory material. More specifically, the end wall 1*a* is shaped as the upper half of the so-called mylar balloon shape or elastica shape. The elastica shape is defined as the shape obtained by rotating the curve known as the right lintearia about the axis extending through its inflection points, in this case the central axis C. In this shape, the end wall 1*a* is substantially fully in compression during normal operation of the engine 100. For each point p on the end wall 1*a*, the radius of curvature $\rho_p$ of the end wall 1*a* at that point can be calculated as follows, wherein $R_p$ denotes the radius of the end wall 1*a* at that point and R denotes the radius of the cylindrical sidewall 1*b*:

$$\rho_p = \frac{R^2}{2 \cdot R_p}$$

In general, it is preferred if at each point along the wall member 1 where the wall member 1 is in contact with the heating zone 5, the wall member 1 is tangent to, or coincides with, an imaginary surface defined by the upper half of a mylar balloon shape that is coaxial with the wall member 1 or, more specifically, has a main axis coinciding with the central axis C of the wall member 1, wherein the curvature of the wall member 1 at that point does not exceed the curvature of said imaginary surface at that point.

Figure 5:
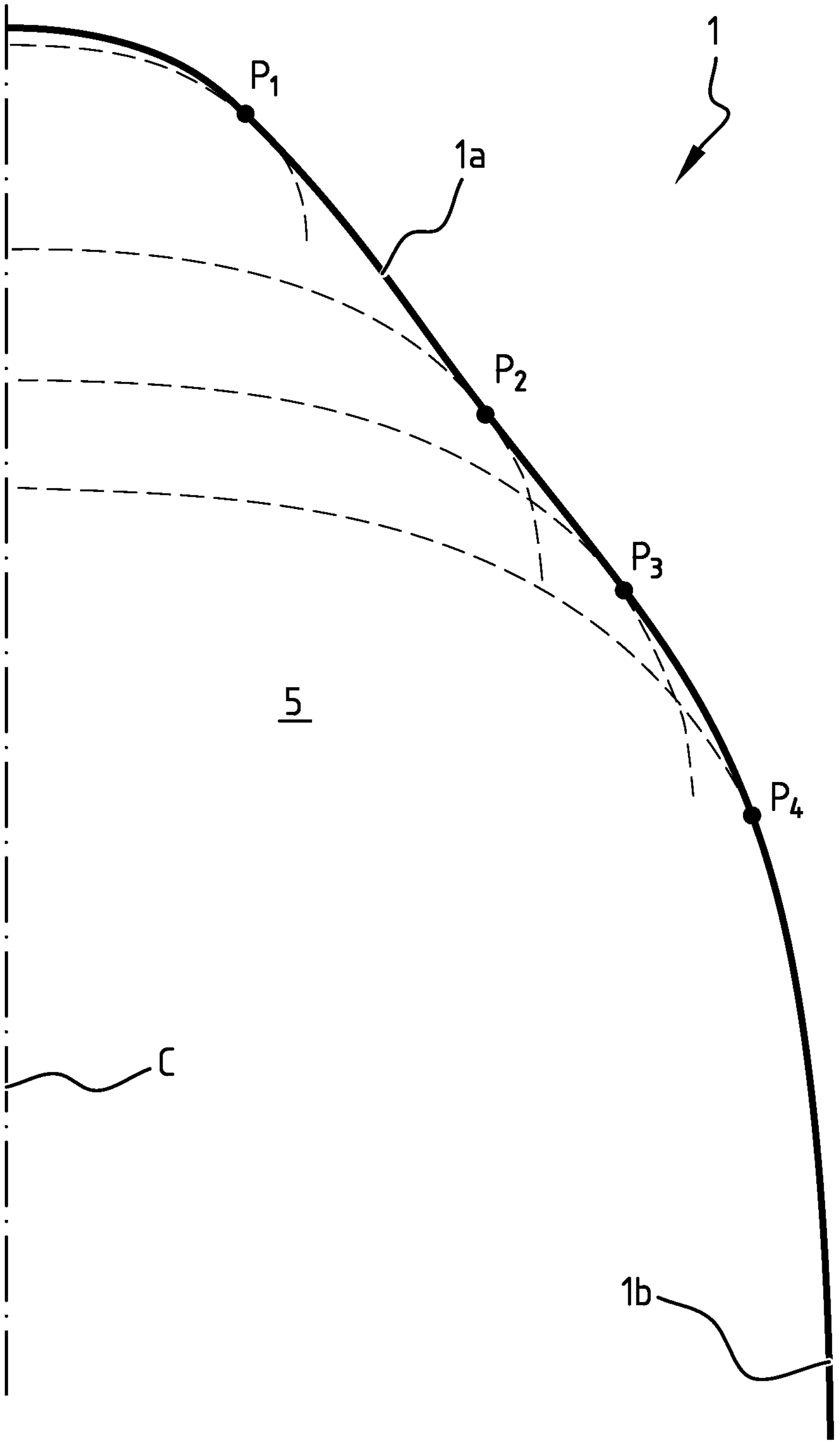

FIG. 5 represents a further example of such a wall member 1 in cross-section, wherein only one half of the wall member 1 is shown. As can be seen, at each point $P_1$, $P_2$, $P_3$, $P_4$ along the wall member 1 where the wall member 1 is in contact with the heating zone 5, the wall member 1 is tangent to an imaginary surface (indicated as a dashed line) which is defined by the upper half of a mylar balloon shape that is coaxial with the wall member 1, wherein the curvature of the imaginary surface at the respective point $P_1$, $P_2$, $P_3$, $P_4$ exceeds the curvature of the wall member 1 at that point $P_1$, $P_2$, $P_3$, $P_4$.

The figures and the above description serve to illustrate specific embodiments of the invention and do not limit the scope of protection defined by the following claims.

The invention claimed is:

1. A hot air engine for converting heat into motion, wherein the engine comprises:

a wall member, defining a central axis and comprising a cylindrical wall surrounding the central axis and an end wall extending through the central axis;

a displacer member comprising a cylindrical displacer part co-axial with the cylindrical wall and a displacer end part extending through the central axis, wherein the end wall and the displacer end part define a first chamber for containing a working fluid and wherein the cylindrical wall member and the cylindrical displacer member define a regenerator passage extending from the first chamber to a second chamber of the engine, wherein the displacer member is movable, relative to the wall member, back and forth along the central axis to move the working fluid back and forth between the first chamber and the second chamber through the regenerator passage;

a heating system provided with a heating zone separated from the first chamber by the end wall, wherein the end wall is configured for conducting heat from the heating zone to the first chamber, wherein the cylindrical displacer part and the displacer end part together surround the cylindrical wall and the end wall, wherein the end wall defines the heating zone within the wall member, wherein the end wall is concave towards the heating zone and convex towards the first chamber.

2. The hot air engine according to claim 1, wherein the end wall is made of a refractory material.

3. The hot air engine according to claim 1, wherein the heating system is provided with one or more supply passages for an inflow of fuel and air into the heating zone, wherein the heating system is arranged to combust the fuel in the heating zone, wherein the heating system is further provided with an exhaust passage for an outflow of combustion products from the heating zone.

4. The hot air engine according to claim 3, wherein the exhaust passage extends from the heating zone along the regenerator passage and is separated from the regenerator passage by the cylindrical wall, wherein the wall member is configured for conducting heat from the exhaust passage to the regenerator passage.

5. The hot air engine according to claim 1, further comprising a housing surrounding the displacer member, wherein the housing and the displacer member define a pressure space therebetween, wherein the pressure space is arranged to be pressurised, wherein:

the displacer member is movable within the housing back and forth along the central axis; or the displacer member and the housing are attached to each other and are jointly movable back and forth along the central axis.

6. The hot air engine according to claim 5, wherein the displacer member comprises insulating material.

7. The hot air engine according to claim 3, wherein the heating system comprises a cylindrical heat exchanging wall co-axial with the cylindrical wall of the wall member, wherein the cylindrical wall and the heat exchanging wall define the exhaust passage therebetween, wherein the supply passage extends to the heating zone along the exhaust passage and is separated from the exhaust passage by the heat exchanging wall.

8. The hot air engine according to claim 1, further comprising a motion conversion system arranged to convert movement of the displacer member into mechanical work.

9. The hot air engine according to claim 8, wherein the motion conversion system comprises a piston system comprising a cylinder and a power piston arranged movable back and forth within the cylinder to alternatingly compress and expand the working fluid in the second chamber.

10. The hot air engine according to claim 9, wherein the motion conversion system is arranged to couple respective reciprocating movements of the power piston and the displacer member such that the reciprocating movements of the power piston and the displacer member are out of phase.

11. The hot air engine according to claim 1, wherein the wall member and the heating system are provided with mutually cooperating installation means for removably mounting the heating system to the wall member.

* * * * *